2 Sheets—Sheet 1.
SMITH & WESSON.
Magazine Fire-Arm.
No. 279.
Reissued Oct. 10, 1854.
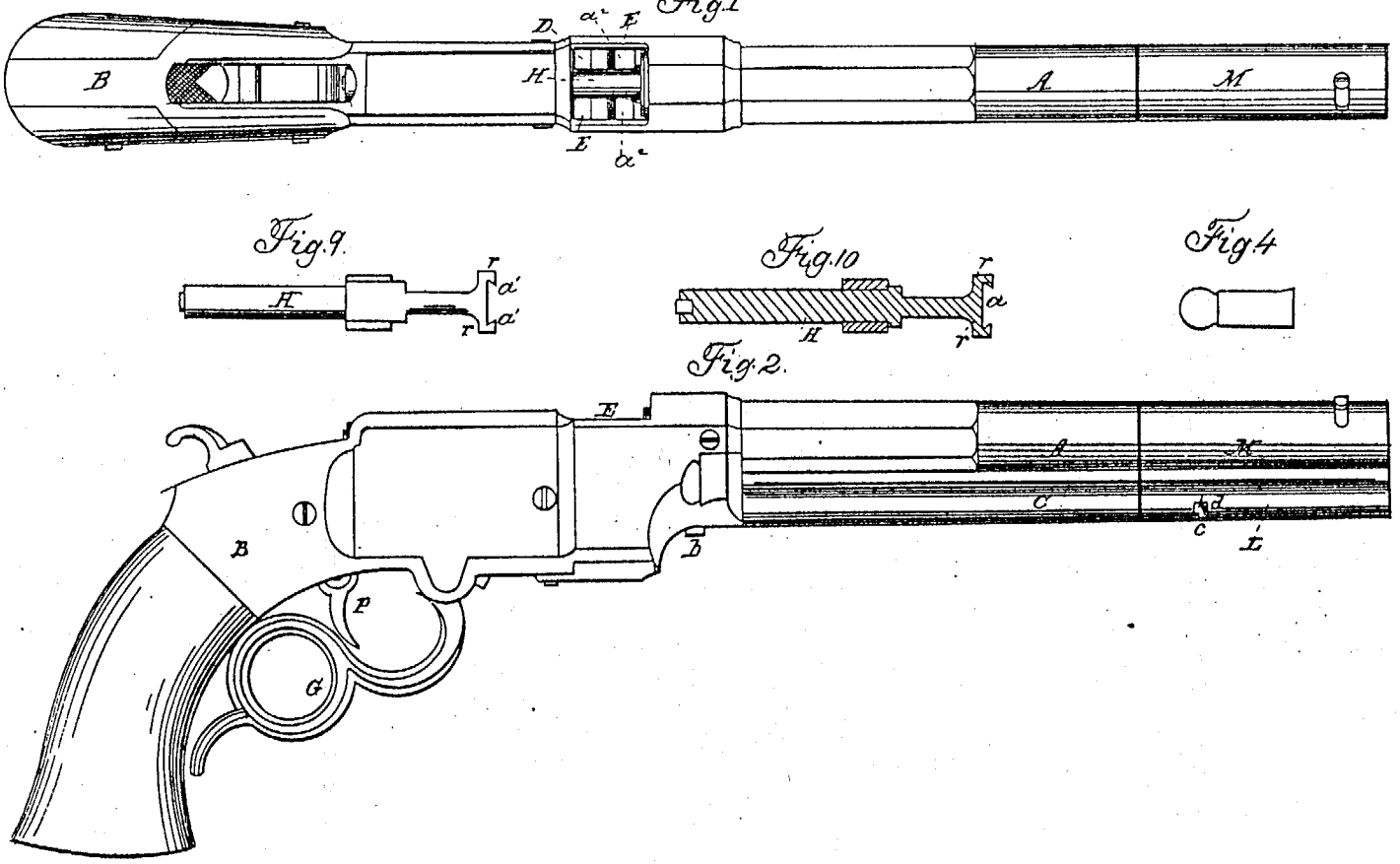

SMITH & WESSON.
Magazine Fire-Arm.
No. 279.
2 Sheets—Sheet 2.
Reissued Oct. 10, 1854.
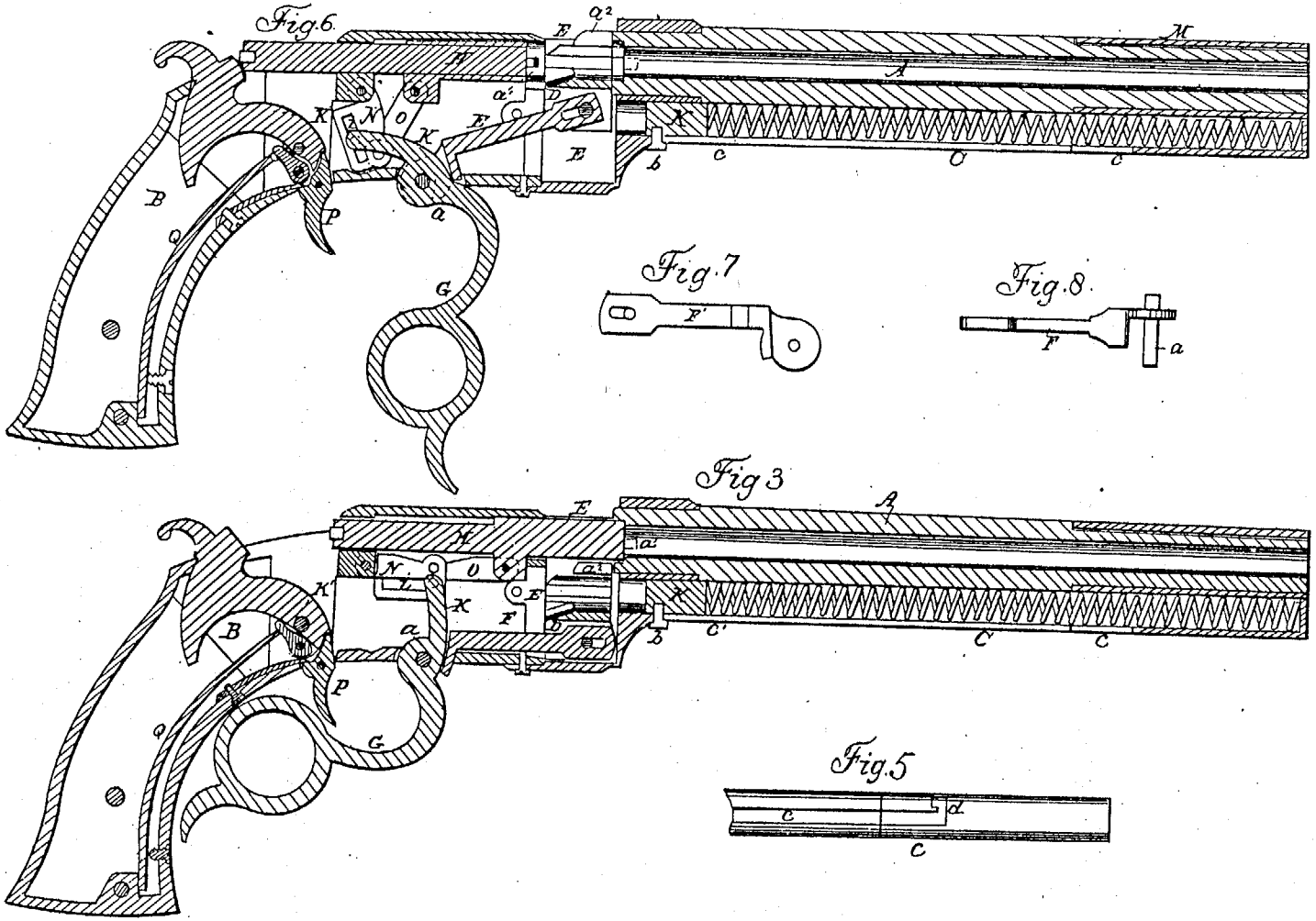

BEST AVAILABLE COPY

UNITED STATES PATENT OFFICE.

HORACE SMITH AND DANIEL B. WESSON, OF NORWICH, CONNECTICUT.

IMPROVEMENT IN FIRE-ARMS.

Specification forming part of Letters Patent No. 10,535, dated February 14, 1854; Reissue No. 279, dated October 10, 1854.

*To all whom it may concern:*

Be it known that we, HORACE SMITH and DANIEL B. WESSON, of Norwich, in the county of New London and State of Connecticut, have invented certain new and useful Improvements in Guns, Pistols, or Fire-Arms; and we do hereby declare that the same is fully described and represented in the following specification and the accompanying drawings, letters, figures, and references thereof.

Of the said drawings, Figure 1 denotes a top view, Fig. 2 a side view, and Fig. 3 a vertical and central section, of one of our improved fire-arms or pistols. Fig. 4 is a side view of the kind of cartridge to be used therein, it being the same as is used in that species of pistols usually termed the "saloon-pistol," it being, as we believe, a French invention.

This cartridge has its case of thin copper, and with a projecting bottom that contains the percussion-powder, the ball being inserted in the other end or top of the case.

The form of the cartridge and the manner and material of which it is constructed may be somewhat changed and still leave the cartridge applicable to our improved fire-arm, it being understood that the cartridge is to be so made as to contain the load and percussion-powder, the latter being placed in it so as to be fired by concussion produced by percussion, as hereinafter described.

In the drawings above referred to, A denotes the barrel of the piece, and B the stock or lock case.

Underneath the barrel is a long tube, C, that serves as a magazine for carrying the cartridges. This magazine and the barrel have at their rear ends a carrier or slide block, D, whose office is to receive a cartridge from the magazine and transfer it or raise it up into line with the barrel. For this purpose the said carrier is caused to slide up and down within a chamber, E, and to be moved by a lever, F, that plays or turns on a fulcrum, *a*, with the trigger-guard G, which is also a lever, and made to turn on the same pin *a*. A piston-slide, H, is also employed to force the cartridge out of the carrier, when the latter is raised to its highest position, and into the barrel.

The cartridges are placed one after the other in the magazine, and are pressed toward the carrier by means of a helical spring, I, that bears against a cylindrical slider, K, from which a screw-pin, *b*, projects, and extends into and through a long slot, *c*, that is made lengthwise in the magazine, and opens into another and short slot, *d*, that is cut through a spring chamber or tube, L, which is so applied to the barrel, by means of a clasping-tube, M, as to be capable of being turned laterally entirely out of line with the magazine, so as to permit the latter to be supplied with cartridges whenever necessary.

The slot *d* of the spring-chamber is turned at its upper end a short distance at right angles to its main part; thence it is turned down a short distance parallel to such main part, the whole being as represented in Fig. 5, and for the purpose of confining the spring within the chamber in a contracted state.

By applying the finger to the head of the screw *b*, and pushing the slider K toward the spring I, we can crowd the spring entirely into the chamber L, and so as to carry the screw *b* to the upper part of the slot *d*. When this is the case, if we press the screw laterally into the bent part of the groove, the spring may be preserved in place in the chamber while such chamber is turned out of line with the magazine-tube.

The piston-slide H is operated or moved back and forth by toggle-joints N O, that are worked by the trigger-guard G, the position of the several parts of the fire-arm, when the lower arm of the trigger-guard is moved entirely forward or away from the stock, being represented in Fig. 6, which represents a longitudinal section of the pistol under such circumstances.

The toggles are jointed to the slide H and the lock or stock frame. They are moved up and down by an arm, *k*, projecting upward from the trigger-guard, and provided with one or more studs to enter and slide into a slot, *i*, formed through or affixed to the back toggle.

BEST AVAILABLE COPY

When the toggles are brought into a straight line with each other the piston-slide H is hard up against the rear end of the cartridge, and serves as a breech to the barrel.

Fig. 9 denotes a top view of the piston-slide H. Fig. 10 is a horizontal and central section of it.

This piston-slide H is made with a head or end of suitable shape to pass through the carrier and close the rear end of the bore of the barrel when forced against it. In rear of this head the piston-slide is reduced in width, as seen at *p* in Figs. 9 and 10, it being so reduced for a distance at least equal to the length of the carrier D, and for the purpose of passing out of the opening *q*, made through the top of the carrier and leading out of its cartridge-chamber. The front end of the said slide is formed with dovetail projections or a recess, $a^1$, which flares or is made wider as it descends, as seen at *r r*. This dovetail or recess is for the purpose of withdrawing from the barrel, after a discharge, the metal or remainder of the cartridge.

The forward pressure of the piston-slide and the blow of the hammer against it forces the metal or remains of the cartridge into the recess or dovetail of the piston-slide, and so as to cause it (the slide) to grasp or hold it (the cartridge) with sufficient power to enable it to be drawn out of the barrel when the piston-slide is next retracted.

Having withdrawn the remainder of the cartridge from the barrel and over the carrier, projections $a^2$ $a^2$ (see Figs. 1, 3, and 6) on the carrier are forced into contact with such remainder by and during the next upward movement of the carrier and expel it from the piece or fire-arm. These projections constitute the boundaries of the opening *q*, and they perform an important function—viz., the expulsion from the chamber E of the remainder of the cartridge, or that part of it which is withdrawn from the barrel by the piston or breech slide after a discharge, and previous to the introduction of the next cartridge into the barrel. The construction of the carrier so that it may not only pass down by the piston-slide and to the magazine while the slide is up against the barrel, but so that it will expel the remainder of the cartridge extracted from the barrel by the slide, constitutes an important feature of our improved fire-arm.

The cock or percussion-hammer is arranged in rear of the piston and breech slide H, and turns on a pin, *k'*, and is made to strike directly against the rear end of the slide H, and to inflame the priming by the concussion produced by its percussion or blow on such end.

The trigger is shown at P, and the main-spring at *q*. This cock or percussion-hammer is also so arranged that it shall be elevated or set to full-cock by the back-pressure on it of the slider H, induced by the toggles and the trigger-guard, when the latter is moved away from the stock. Thus the trigger-guard, when so moved, is made to simultaneously cause the hammer to be cocked, the piston-slide to be forced back, and the carrier to be elevated. The carrier-lever is elevated by the lower arm of the trigger-guard lever and depressed by the upper arm thereof, the carrier-lever being so shaped, as seen in Figs. 7 and 8, (which are side and top views of it,) and applied to the trigger-guard lever, as to enable the latter to actuate it.

We do not claim the employment of a carrier or slide for transferring the cartridge from the magazine to the barrel, nor the employment and combination therewith of a piston or slide to force the cartridge out of the carrier and into the barrel; nor do we claim the employment of a piston-slide, H, as a breech to the barrel, nor the firing by concussion instead of by percussion; nor do we claim the improvement of making or applying the percussion-hammer so as to strike on the rear end of a small pin, (instead of directly against its cartridge or priming,) and so that the priming at the front or lower end of the pin shall be exploded by concussion produced by the percussion blow of the hammer on the other end of it; but What we do claim as our invention is—

1. The combining the percussion-hammer, the piston-slide, and the barrel, so that the said piston-slide shall not only serve as a breech to the barrel, but at the same time as a means of conveying (by concussion) to the priming of the cartridge at one end of the slide the force of the blow of the hammer upon the opposite end of the slide, as specified.

2. We also claim the improvement in the carrier, whereby it is not only enabled to be moved downward while the breech-slide is forward against the barrel or cartridge therein, but is caused to expel from the chamber E, in which it moves, the remainder of the cartridge after such remainder has been retracted by the piston-slide, and while the carrier is being elevated with another cartridge, the said improvement consisting in making the carrier with an opening or passage leading out of the cartridge-chamber thereof, and of a width sufficient for the movement of the piston-slide out of the carrier during the descent of the latter, and providing said carrier with one or more projections, $a^2$, or the equivalent thereof, which, when the carrier is elevated, shall be moved against the remainder of the cartridge and elevate and expel it from the fire-arm, as stated, the breech-slide or piston-slide being formed substantially as specified.

3. We also claim the arrangement and application of the percussion-hammer with respect to the breech-slide H and the trigger-guard lever so that the hammer may be moved and set to full-cock by the pressure or back action of the slide induced by the action of the trigger-guard lever, as specified.

4. We also claim the improvement of making the front end of piston-slide with a dovetail recess, $a^1$, (or its equivalent,) for the purpose of enabling the slide to seize the metal or remainder of the cartridge and withdraw it from the barrel when it (the piston-slide) is next retracted, the said remainder being discharged from the slide by the upward movement of the carrier, all substantially as specified.

In testimony whereof we have hereunto set our signatures this 13th day of September, A. D. 1854.

HORACE SMITH.
D. B. WESSON.

Witnesses:
H. H. STARKWEATHER,
EDWARD PARKER.